UNITED STATES PATENT OFFICE 2,647,829

DECOMPOSITION OF COPPER SCRAP AND ALLOYS WITH COPPER AMMONIUM CARBONATE SOLUTIONS

Patrick J. McGauley, Glen Cove, N. Y., and Paul J. Masur, Sayreville, N. J., assignors to Chemical Construction Corporation, New York, N. Y., a corporation of Delaware No Drawing. Application December 17, 1949, Serial No. 133,665

5 Claims. (Cl. 75—103)

The present invention relates to the recovery of copper from copper-bearing metal scrap. In particular, it relates to an improved leaching method, whereby the copper content of such materials is dissolved and/or separated from other metals much more quickly, simply and easily than previously considered possible.

In recent years the metals trades have been faced with a constantly increasing demand for non-ferrous metals, particularly copper. This is accompanied by a decrease in known reserves of high-grade ore and rapidly increasing costs in the mining and refining of lower grades. As a result, more and more interest is being displayed in methods for recovering the copper content in copper-bearing scrap.

Such materials are commercially available in relatively large quantities. Unfortunately they involve a wide variety of materials, both as to differing alloy contents and as to differing materials which may be present. There are available, however, large quantities of relatively "clean" copper and brass scrap. In these materials the most common diluents are zinc and/or tin. In some cases, some iron, lead and minor amounts of other metals are present.

Again unfortunately, there are available no really satisfactory methods of recovering the copper-content, even from these better grades of copper and brass scrap. From the commercial viewpoint, the current copper recovery practice is probably the best previously-available for this purpose. It is subject to many drawbacks. These can be readily illustrated by a consideration of that process.

Copper-bearing scrap materials are charged into large leaching vats and flooded with a dilute oxidized solution of ammoniacal copper ammonium carbonate. After the vessels are full of solution, the latter is gently circulated through the tanks, pumped through an oxidizing tower and returned to the tanks. In this manner the copper in solution is alternately oxidized to the cupric salt and then reduced to the cuprous state in dissolving more copper from the scrap. New solution, barren of copper, is constantly being added to the system and pregnant solution withdrawn.

The over-all result of the process is that not only copper but also zinc and the various soluble impurities are gradually dissolved into a relatively dilute ammoniacal copper-ammonium carbonate solution. Ammonium carbonate and ammonia are then steam distilled from this solution. Copper is thus precipitated and recovered, principally as impure cuprous oxide. Mother liquor from the still is discarded. Ammonia and carbon dioxide vapors are condensed in water and reused in the leaching of more scrap.

A number of the objectionable features are readily apparent, even from the foregoing summary. The process is extremely slow. Leaching of normal copper scrap with these dilute solutions requires that the scrap remain in the leaching tanks for a period of at least three to six weeks. This unreasonably long leaching period requires such a large and expensive inventory of metal and reagents in process that the carrying charges become an important item in the total cost of processing. The long leaching period also requires an excessive investment in leaching tanks and other equipment. The long period permits the relatively dilute leaching solutions time to dissolve much of the zinc and other impurities. These are later precipitated as impurities in the copper oxide product from the still.

Copper oxides, which precipitate in the still, tend to build up on the inside of the vessel and must be periodically removed by hand labor. High steam requirements for the still also are an important part of the cost of the process. The resulting impure copper product then must be fused, reduced and refined before it is marketable as commercial copper metal.

It would seem fairly simple to be able to increase the leaching rate. For example, it would appear to be more desirable to increase the concentration of the leaching liquor. However, the economy of still operation makes the use of dilute leaching solutions desirable. If the concentration is increased, the economy of still operation is adversely effected to offset any economic gain in the shorter time required for leaching.

It is, therefore, the principal object of the present invention to devise a method which is not seriously hampered in commercial development by these difficulties. Preferably such a process should be much faster, be simpler in operation, operate at reduced inventories and utilize the equipment more efficiently. It should involve no unusual apparatus or ingredients.

Surprisingly, in view of the fact that the need for such a process has been so long unfilled, the objects of the invention have been simply and easily met. In accordance with the present invention, it has been found that if a highly concentrated solution of ammoniacal copper carbonate is allowed to stand in contact with pieces of copper scrap or brass they are decomposed into an easily and quickly leached sludge.

Surprisingly, the latter appears to have about the same relative composition as the solid metal from which it is produced. The copper content may then be quickly and easily dissolved from the sludge. In some cases, as with clean brass scrap, the zinc may be preferentially dissolved, leaving a high grade copper powder.

In carrying out the present process, it is highly desirable but not necessarily essential, to start with clean scrap. In this way, the sludge may be treated, as noted above, to obtain pure copper powder, since the sludge comprises only subdivided reduced metals. For this reason, it is often desirable to remove any dirt, oil, or grease from the scrap. This may be accomplished by washing with detergents and/or solvents and/or by burning in accordance with known procedures.

When this can be done sufficiently cheaply, it provides a simple method of obtaining pure copper powder from scrap copper or brass. After reduction of the brass metal to the sludge state, for example, it is only necessary to dissolve the zinc or the like metals and metallurgical impurities with a hot dilute acid, preferably sulfuric acid. The residual copper powder, which is of saleable purity, is then washed, collected and dried.

The present invention is not limited to this direct method however. Most grades of commercial scrap will contain non-acid-soluble siliceous and organic impurities, as well as external "dirt." Accordingly, a more general procedure has been developed which is adapted to scrap of wider type of metals classification and grades.

In general, the process starts with the discussed decomposition of the metal scrap. This is simply accomplished in any available corrosion-resistant vessels. The scrap is placed therein and treated, preferably hot, with a highly concentrated solution of ammoniacal copper carbonate. The higher the concentration, the more rapid the action. Therefore, as nearly saturated solutions as it is possible to maintain economically should be used.

Obviously, the time required for the reduction to sludge will depend on numerous factors. Among these are the relationship between the exposed surface and the cross-sectional area of the scrap. For this reason, smaller pieces are preferred. An economic balance should be taken between the cost of subdividing the scrap and the savings due to decreased treating time to determine the most advantageous size. Other factors include the temperature; the concentrations of dissolved copper, ammonium carbonate and free ammonia in the solution; agitation of the liquor or its absence, and the like. Treatment is, of course, continued until the solid metal is substantially completely decomposed to the sludge.

If the treating solution is sufficiently concentrated in cupric ammonium carbonate, little or no metal will be dissolved, other than that present originally as reactant. Preferably, this liquor should contain 250–300 or more grams per liter of cupric copper as well as a high concentration of dissolved ammonia. The concentration of $CO_2$ in solution should be relatively low. Because of the dissolved ammonia and because temperature increases the decomposition rate, it is desirable to work in closed vessels at slightly increased temperatures up to 100°–150° F., or more.

After decomposition, the sludge may be rapidly leached to dissolve the copper. A good practice is to do so at about atmospheric pressure and at temperatures up to about 100°–150° F., preferably at about 110°–125° F. Preferably this, also, is done with an ammoniacal solution of copper ammonium carbonate. While this solution is not as highly concentrated as that used in the decomposing operation, it is much more concentrated than the leach liquors used in the prior art. Preferably, it should contain about 80–110 grams per liter of cupric copper, although these limits may be exceeded. Preferably, but not necessarily, air, oxygen, or oxygen-enriched air is blown through the mixture during this treatment.

Filtration of the resultant leached sludge separates the solution of dissolved copper from the residual lead, iron and/or tin and non-solubles in the sludge. This sludge residue is then treated or disposed of in some manner, not a part of the present process. If necessary, it may be discarded. Since the intrinsic value of the lead or tin is also high, some attempt at recovery is generally made.

Treatment of the copper-bearing solution is then carried out to recover the copper. In general, this treatment follows the process disclosed in the application for United States Patent, Serial No. 86,156, filed April 8, 1949, by E. S. Roberts. The most notable difference is that here a much greater proportion of the copper may be recovered from each batch in most cases.

More particularly, the copper solution is cooled to below about 100° F., preferably below 90° F., and saturated with reducing gases to help assure the copper being in cuprous condition. Saturation is carried out at a temperature below about 90°–100° F. and at pressures up to 1000–1200 pounds per square inch gauge pressure or higher, depending on the available apparatus. The reducing gas should contain an appreciable CO content. Pure CO is to be preferred but is, of course, generally impractical. Producer gas, water gas, or the like, containing CO and $CO_2$ is quite satisfactory.

The resultant solution is then heated with live steam. This is normally done in an autoclave, preferably equipped for agitation, using steam to produce a temperature up to about 250°–300° F. Higher temperatures may be used, if so desired, but this practice would increase the apparatus requirements. The pressure need not exceed the equivalent pressure for the temperature used. Treatment is continued until copper precipitation of sufficient purity ceases.

The extent to which precipitation is carried depends upon the nature of the scrap and the metal content, other than copper, in the leach liquor. Precipitation of copper in sufficient purity may be carried out down to a residual copper content at which the dissolved cuprous copper approaches a mol ratio to the next most concentrated dissolved reducible metal which approaches 1 to 1. Where varied scrap is treated, some known safe degree of precipitation, usually below 70%, for example 50–60% of the precipitatable copper, is usually employed as a limit. The residual liquor is then recycled to leaching after being cooled and depressurized.

Copper metal, as precipitated, is ordinarily continuously discharged as slurry to a high pressure settling vessel. Herein the metal, liquid and gas are each separated and removed. The liquid is cooled, depressurized and returned to leaching, as noted above. The gas is first washed free of $NH_3$ and then the residual $CO_2$ is returned to the gas producer system or vented, as the case may be. The various wash solutions, and usually a part of the leach solution, is discarded from the process through an ammonia still, the condensate from the latter being returned to leaching to balance the cycle.

Copper metal sludge is treated to recover the product metal. Ordinarily this will constitute a process of depressurizing, washing, boiling in dilute sulfuric acid, washing and drying. Any small amounts of lead, nickel, cobalt, or the like in the precipitated copper are easily and preferentially dissolved therefrom during the washing steps. Drying is preferably carried out in a hydrogen atmosphere to prevent reoxidation. The metal powder may then be pressed into suitable form or sold per se. At this stage it will have a purity of 99.9+% copper.

We claim:

1. In recovering copper from copper-bearing metals, the improvement in leaching which comprises treating pieces of said metals with a strong ammoniacal-copper carbonate solution, said treating solution being substantially saturated as to copper, principally in the cupric condition, and containing sufficient ammonia to keep the copper in solution; continuing said treatment until said pieces are substantially converted to a soft sludge of substantially the same copper content as said pieces; and then, with a different liquor, leaching said sludge to separate copper from other metals therein.

2. A process according to claim 1 for treatment of metals selected from the group consisting of copper and alloys and mixtures of copper with acid-soluble metals, which is characterized by leaching the soft sludge with an aqueous mineral acid sludge, whereby acid-soluble metals are dissolved, leaving a copper residue.

3. A process according to claim 1 for the treatment of brass which is characterized by leaching the soft sludge with a dilute aqueous mineral acid, whereby zinc is dissolved, leaving a copper residue.

4. A process according to claim 1 which is characterized by leaching said soft sludge with a sufficient amount of a leaching liquor, comprising an aqueous ammoniacal copper carbonate solution of substantially lower initial total and cupric copper content than the treating liquor used during decomposition of pieces to the sludge, for sufficient time to dissolve substantially all the copper content of said sludge.

5. A process according to claim 4 in which the leaching liquor has an original concentration of about 80–110 grams per liter of cupric copper.

PATRICK J. McGAULEY.
PAUL J. MASUR.

References Cited in the file of this patent

UNITED STATES PATENTS

| Number | Name | Date |
|---|---|---|
| 1,516,356 | Taplin | Nov. 18, 1924 |

FOREIGN PATENTS

| Number | Country | Date |
|---|---|---|
| 270,763 | Great Britain | July 12, 1928 |
| 282,112 | Great Britain | May 7, 1926 |
| 292,302 | Germany | June 21, 1912 |